United States Patent [19]

Grimm

[11] Patent Number: 4,520,156

[45] Date of Patent: May 28, 1985

[54] SCORCH INHIBITORS FOR CARBOXYLATED RUBBERS

[75] Inventor: Donald C. Grimm, Tallmadge, Ohio

[73] Assignee: The Goodyear Tire & Rubber Company, Akron, Ohio

[21] Appl. No.: 648,394

[22] Filed: Sep. 7, 1984

[51] Int. Cl.³ .................................................. C08K 5/09
[52] U.S. Cl. .................................... 524/397; 524/432
[58] Field of Search ................................. 524/397, 432

[56] References Cited

U.S. PATENT DOCUMENTS 4,415,690 11/1983 Grimm ................................. 524/432

Primary Examiner—Paul R. Michl
Assistant Examiner—N. Sarofin
Attorney, Agent, or Firm—Alvin T. Rockhill

[57] ABSTRACT

Scorch (the premature cross-linking of an elastomer) is a problem that is often encountered in carboxylated rubbers. Salts of certain succinic acid derivatives can be used to greatly improve the scorch resistance of carboxylated rubbers. These salts can be distributed throughout a carboxylated rubber using any procedure that will result in a thorough mixing to form a rubber composition with improved scorch resistance.

22 Claims, No Drawings

SCORCH INHIBITORS FOR CARBOXYLATED RUBBERS

BACKGROUND OF THE INVENTION

Carboxylated rubbers (rubbers containing carboxyl groups in their polymer chain) are useful for many purposes. For example, carboxylated nitrile rubber (XNBR) is a terpolymer of butadiene, acrylonitrile, and methacrylic acid that has outstanding abrasion resistance. Metal oxide vulcanizates of carboxylated elastomers also have unusually high tensile strengths, superior ozone resistance, and elevated modulus values. Such carboxyl modification of a rubber typically involves the addition of about 0.75 percent to 15 percent by weight of an unsaturated carboxylic acid of the acrylic acid type to the monomer charge composition of the carboxylic rubber being synthesized.

These carboxylated elastomers can be vulcanized in a manner analogous to their uncarboxylated counterpart utilizing a sulfur curing agent. In addition to this, if a polyvalent radical and particularly divalent metals are available in the vulcanization recipe, the carboxyl groups in the polymer chain can take part in this cross-linking reaction. This cross-linking reaction is fast in the presence of divalent metals and scorch problems are often encountered. Even at room temperature, carboxylated rubbers will often cure in 48 hours or less in the presence of zinc oxide when uninhibited. Since scorch (the premature cross-linking of an elastomer) can render a rubber completely unworkable, it is necessary to control this cross-linking reaction between carboxyl groups on the polymer chain.

Various chemical compounds have been used as scorch inhibitors in numerous different types of rubber. One of the most commonly used scorch inhibiting agents is stearic acid. U.S. Pat. No. 3,880,821 discloses the use of oligomers of linoleic acid and the magnesium, aluminum, calcium and barium salts thereof as scorch inhibiting agents for use in halogenated butyl rubbers. Zinc peroxide is sometimes used as the activator for curing carboxylated rubbers instead of zinc oxide to increase the rubbers scorch safety. However, the use of zinc peroxide in the curvature is expensive in comparison to using zinc oxide because it generally needs to be employed in larger amounts than does zinc oxide and is also normally much more expensive to buy than zinc oxide.

SUMMARY OF THE INVENTION

Salts of certain succinic acid derivatives can be used as scorch inhibitors in carboxylated rubbers. These salts are very effective as scorch inhibiting agents for carboxylated rubbers and their use even allows for carboxylated rubbers to be cured with divalent metal oxides, such as zinc oxide, while maintaining excellent scorch safety. The succinic acid derivative salts which can be used as scorch inhibitors are prepared by reacting succinic anhydrides having the structural formula:

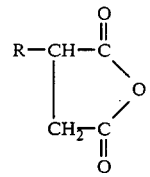

wherein R is an alkyl or alkenyl moiety containing from 8 to 25 carbon atoms, inclusive or dicarboxylic acids having the structural formula:

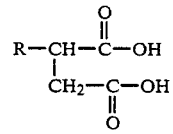

wherein R is an alkyl or alkenyl moiety containing from 8 to 25 carbon atoms, inclusive with a metal or ammonium salt. The succinic acid derivative salts used as scorch inhibitors in the practice of this have the general structural formula:

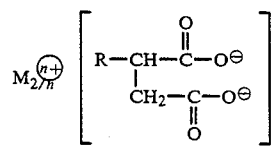

wherein M is a cation with a charge of positive one or positive two. In most cases M will be a monovalent (Group I) metal, such as lithium, sodium, potassium, rubidium, or cesium; a divalent (Group II) metal, such as beryllium, magnesium, calcium, strontium or barium; or an ammonium or substituted ammonium ion.

This invention more specifically discloses an improved scorch resistant carboxylated rubber composition comprising: (1) a carboxylated rubber and (2) at least one salt of a succinic acid having the structural formula:

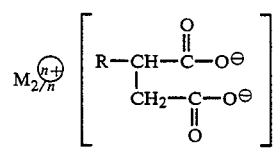

wherein R is an alkyl or alkenyl moiety containing from 8 to 25 carbon atoms, and wherein M is a cation having a charge of positive one or positive two, and wherein n is 1 or 2 with the proviso that n is 1 if M has a charge of positive one and with the proviso that n is 2 if M has a charge of positive two; which is distributed throughout said carboxylated rubber composition to improve the scorch safety of said rubber composition without significantly affecting the cure rate of said rubber composition.

This invention also reveals a process for improving the scorch resistance of a carboxylated rubber composition comprising distributing throughout a carboxylated rubber at least one succinic acid derivative salt having the structural formula:

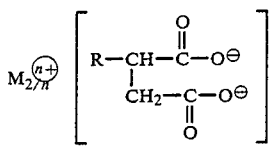

wherein R is an alkyl or alkenyl moiety containing from 8 to 25 carbon atoms, wherein M is a cation having a charge of positive one or positive two, and wherein n is 1 or 2 with the proviso that n is 1 if M has a charge of positive one, and with the proviso that n is 2 if M has a charge of positive two, to improve the scorch safety of said rubber composition.

DETAILED DESCRIPTION OF THE INVENTION

The carboxylated rubbers (elastomers) to which this invention pertains contain chain linkages derived from unsaturated carboxylic acids of the acrylic acid type (unsaturated carboxylic acid monomers). Some representative examples of unsaturated carboxylic acids of the acrylic acid type include acrylic acid, methacrylic acid, sorbic acid, $\beta$-acryloxypropanoic acid, ethacrylic acid, 2-ethyl-3-propyl acrylic acid, vinyl acrylic acid, cinnamic acid, maleic acid, fumaric acid, and the like. Carboxylated rubbers generally contained from about 0.75 percent to 15 percent by weight chain linkages (repeat units) which are derived from unsaturated carboxylic acid monomers.

These carboxylic rubbers can be synthesized using any conventional polymerization technique. Emulsion polymerization of carboxylated elastomers is generally preferred and is used almost exclusively in industrial production. This type of a synthesis generally utilizes a charge composition comprising water, monomers, an initiator, and an emulsifier (soap). Such polymerizations can be run over a very wide temperature range from about 0° C. to as high as 100° C. It is more preferred for these polymerizations to be run at a temperature from about 5° C. to 60° C.

The amount of carboxylic acid monomer (unsaturated carboxylic acid of the acrylic acid type) incorporated in a carboxylated rubber may be varied over a wide range. The monomer charge ratio between the carboxylic monomer and the comonomers employed in a polymerization may also be varied over a very wide range. Generally the charge composition used in the synthesis of carboxylated nitrile rubbers will contain 60% to 75% by weight butadiene, 15% to 35% by weight of acrylonitrile, and 1% to 15% by weight methacrylic acid, based upon the total monomer charge. A typical charge composition for a carboxylated nitrile rubber will contain 65 to 69 weight butadiene, 24 to 28 weight percent acrylonitrile, and 5 to 9 weight percent methacrylic acid.

Some other monomers that may be copolymerized with a carboxylic monomer to form carboxylated rubbers include styrene; isoprene; vinylidene monomers having one or more terminal $CH_2=<C$ groups; vinyl aromatic such as $\beta$-methylstyrene, bromostyrene, chlorostyrene, fluorostyrene, vinylphenol, 3-hydroxy-4-methoxystyrene, vinylanisole, $\beta$-nitrostyrene, and the like; $\alpha$-olefins such as ethylene; vinyl halides, such as vinylbromide, chloroethane (vinylchloride), vinylfluoride, vinyliodide, 1,2-dibromoethene, 1,1-dichloroethylene (vinylidene chloride), 1,2-dichloroethylene, and the like; vinyl esters such as vinyl acetate; $\alpha,\beta$-olefinically unsaturated nitriles, such as methacrylonitrile; $\alpha,\beta$-olefinically unsaturated amides such as acrylamide, N-methyl acrylamide, N-t-butyl acrylamide, N-cyclohexyl acrylamide, diacetone acrylamide, methacrylamide, N-ethyl methacrylamide, and the like; $\alpha,\beta$-olefinically unsaturated N-alkylol amides having the general structural formula:

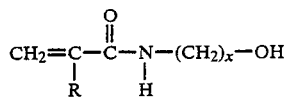

wherein R is a hydrogen atom or an alkyl group containing from 1 to 4 carbon atoms and x is an integer from 1 to 4 inclusive such as N-methylol acrylamide, N-ethylol acrylamide, N-propylol acrylamide, N-methylol methacrylamide, N-ethylol methacrylamide, and the like; vinyl pyridine; N-octyl methacrylate, dodecyl methacrylate, methylethacrylate, and ethyl ethacrylate; haloalkyl acrylates such as chloropropyl acrylate; methacrylates; hyroxyethylacrylate; and polyfunctional compounds such as ethylene glycol dimethacrylate, diethylene glycol diacrylate, divinylbenzene, methylene-bis-acrylamide, and the like. Antioxidants, such as N-(anilinophenyl)-$\alpha$-mercaptoacetamide or N-(4 anilinophenyl)methacrylamide can also be copolymerized into or grafted onto the carboxylated rubber.

In the polymerization of unsaturated carboxylic acids of the acrylic acid type with one or more of the above-mentioned monomers, there can be competing or side reactions which take place. Therefore, the choice of reactants, process conditions, order of addition of reactants and the like, should be selected in order to produce a useful rubber containing carboxyl groups. The monomers employed and monomer ratios used in the charge composition for the polymerization should be selected in a manner that will produce a carboxylated elastomer. It should be noted that many combinations of the above-mentioned monomers will result in the polymerization of a nonelastomeric polymer. The carboxyl modified polymers which are generally preferred include carboxylated nitrile rubber, which is a terpolymer of butadiene, acrylonitrile and methacrylic acid; terpolymers of methacrylic acid, styrene, and butadiene; copolymers of methacrylic acid and butadiene; copolymers of methacrylic acid and isoprene; terpolymers of acrylic acid, acrylonitrile, and butadiene; and terpolymers of methacrylic acid, vinylidene chloride, and butadiene.

The emulsifiers used in the polymerization of such polymers may be charged at the outset of the polymerization or may be added incrementally or by proportioning as the reaction proceeds. Generally, anionic emulsifier systems provide good results, however, any of the general types of anionic, cationic or nonionic emulsifiers may be employed in the polymerization.

Among the anionic emulsifiers that can be employed in emulsion polymerizations are fatty acids and their alkali metal soaps such as caprylic acid, capric acid, pelargonic acid, lauric acid, undecylic acid, myristic acid, palmitic acid, margaric acid, stearic acid, arachidic acid, and the like; amine soaps of fatty acids such as those formed from ammonia, mono- and dialkyl amines, substituted hydrazines, guanidine, and various low molecular weight diamines; chain-substituted derivatives of fatty acids such as those having alkyl substituents; naphthenic acids and their soaps and the like; sulfuric esters and their salts, such as the tallow alcohol sulfates, coconut alcohol sulfates, fatty alcohol sulfates, such as oleyl sulfate, sodium lauryl sulfate and the like; sterol sulfates; sulfates of alkylcyclohexanols, sulfation products of lower polymers of ethylene as $C_{10}$ to $C_{20}$ straight chain olefins, and other hydrocarbon mixtures, sulfuric esters of aliphatic and aromatic alcohols having intermediate linkages, such as ether, ester, or amide groups such as aklylbenzyl (polyethyleneoxy) alcohols, the sodium salt of tridecyl ether sulfate; alkane sulfonates, esters and salts, such as alkylchlorosulfonates with the general formula $RSO_2Cl$, wherein R is an alkyl group having from 1 to 20 carbon atoms, and alkylsulfonates with the general formula $RSO_2$—OH, wherein R is an alkyl group having from 1 to 20 carbon atoms; sulfonates with intermediate linkages such as ester and ester-linked sulfonates such as those having the formula $RCOOC_2H_4SO_3H$ and $ROOC$—$CH_2$—$SO_3H$, wherein R is an alkyl group having from 1 to 20 carbon atoms such as dialkyl sulfosuccinates; ester salts with the general formula:

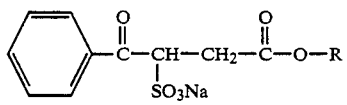

wherein R is an alkyl group having from 1 to 20 carbon atoms; alkaryl sulfonates in which the alkyl groups contain preferably from 10 to 20 carbon atoms, e.g. dodecylbenzenesulfonates, such as sodium dodecylbenzenesulfonate; alkyl phenol sulfonates; sulfonic acids and their salts such as acids with the formula $RSO_3Na$, wherein R is an alkyl and the like; sulfonamides; sulfamido methylenesulfonic acids; rosin acids and their soaps; sulfonated derivatives of rosin and rosin oil; and lignin sulfonates, and the like.

Rosin acid soap has been used with good success at a concentration of about 5 percent by weight in the initial charge composition used in the synthesis of carboxylated elastomers. Of rosin acids, about 90 percent are isometric with abietic acid and the other 10 percent is a mixture of dehydro abietic acid and dihydro abietic acid.

The polymerization of these carboxylated rubbers may be initiated using free radical catalysts, ultraviolet light, or radiation. To insure a satisfactory polymerization rate, uniformity, and a controllable polymerization, free radical initiators are generally used with good results. Free radical initiators which are commonly used include the various peroxygen compounds such as potassium persulfate, ammonium persulfate, benzoyl peroxide, hydrogen peroxide, di-t-butyl peroxide, dicumyl peroxide, 2,4-dichlorobenzoyl peroxide, decanoyl peroxide, lauroyl peroxide, cumene hydroperoxide, p-menthane hydroperoxide, t-butylhydroperoxide, acetyl acetone peroxide, methyl ethyl ketone peroxide, succinic acid peroxide, dicetyl peroxydicarbonate, t-butyl peroxyacetate, t-butyl peroxymaleic acid, t-butyl peroxybenzoate, acetyl cyclohexyl sulfonyl peroxide, and the like; the various azo compounds such as 2-t-butylazo-2-cyanopropane, dimethyl azodiisobutyrate, azodiisobutyronitrile, 2-t-butylazo-1-cyanocyclohexane, 1-t-amylazo-1-cyanocyclohexane, and the like; the various alkyl perketals, such as 2,2-bis-(t-butylperoxy)butane, ethyl 3,3-bis(t-butylperoxy)butyrate, 1,1-di-(t-butylperoxy)cyclohexane, and the like. Cumene hydroperoxide can be used as an initiator to obtain very good results in the polymerization of carboxylated nitrile rubber.

The emulsion polymerization system used in the synthesis of carboxylated rubbers can be treated at the desired degree of conversion with shortstopping agents, such as hydroquinone. Typical shortstopping agents will not interfere with the action of the succinic acid derivative salts as scorch inhibitors. Typical stabilizing agents and standard antioxidants can also be added to the emulsion of a carboxylated rubber without interfering with the action of the salt of the succinic acid derivative of a scorch inhibitor. The carboxylated rubber composition of this invention can also contain, in addition to the carboxylated rubber and scorch inhibiting agent, other unsaturated rubbers and conventional compounding ingredients such as carbon black, other fillers, oils, waxes, antioxidants, and other processing aids.

After the emulsion polymerization has been completed, most conventional coagulating techniques for carboxylated rubbers can be employed if the succinic acid derivative salts are added to the rubber after coagulation. A review of coagulation techniques for nitrile rubbers is presented in Hofmann, Werner "Nitrile Rubber", *Rubber Chemistry and Technology*, vol. 37, no. 2, part 2 (April–June 1964), pp. 94–96, which is incorporated herein by reference. Many of these coagulation techniques will be useful in carboxylated nitrile rubbers. Normally such latexes are coagulated with reagents which insure the preservation of the carboxyl groups of the elastomers as acidic moieties. Coagulation with acid or blends of salts with acids is usually very satisfactory. For example, sulfuric acid, hydrochloric acid, blends of sodium chloride with sulfuric acid, and blends of hydrochloric acids with methanol are very effective as coagulating agents for carboxylated rubber emulsions. Calcium chloride solutions which are free of calcium hydroxide have also been used as coagulants with great success.

After coagulation washing may be employed to remove excess soap and/or electrolyte from the carboxylated rubber. Sometimes washing is also useful in adjusting the pH of the carboxylated elastomer that has been synthesized. After washing, if it is desired, the elastomer can be dewatered. If it is desirable to do so, the carboxylated rubber can also be dried and baled after dewatering using conventional techniques.

The properties of vulcanized nitrile rubbers depend to a great extent upon what vulcanization systems are used in their compounding. A summary of vulcanization systems for nitrile rubbers is given in Hofmann, W., "Nitrile Rubber". *Rubber Chemistry and Technology*, vol. 37, No. 2, part 2 (April–June 1964), pp. 166–167, 184–187, and 196–197, which is incorporated herein by reference. Carboxylated nitrile rubbers can be cross-linked with reagents which are bivalent or polyvalent which react with carboxyl groups. For example, the oxides or hydroxides of polyvalent metals such as zinc, beryllium, aluminum, nickel, chromium, manganese, tin, and the like can be used.

Normally, a metal oxide (zinc oxide, magnesium oxide, copper oxide, calcium oxide or nickel oxide) usually zinc oxide, is mixed into a carboxylated rubber after it has been dried and baled. Usually from about 0.5 to 10 parts of the metaloxide per hundred parts rubber (phr) is employed. Excellent results are obtained using about 5 phr of zinc oxide. This process of mixing the zinc oxide into the rubber is usually carried out by utilizing a Banbury mixer; however, any other procedure that will adequately mix the zinc oxide with the carboxylated rubber can also be employed. The metal oxide is generally utilized in combination with sulfur or a sulfur compound vulcanization agent in order to curve (vulcanize) the rubber. Such a compounded rubber composition can then be vulcanized by heating it which is normally carried out in a mold.

Usually it is advantageous to minimize the time period between the point when the zinc oxide is added and the time at which the carboxylated rubber will be vulcanized (cross-linked). By minimizing this time period the amount of time in which spontaneous cross-linking between carboxyl groups can occur is minimized. Since unwanted cross-linking (scorch) often occurs in processing equipment (sometimes due to heat build-up) before it is desired, the time at which the metal oxide is added is not a total solution to the problem.

By distributing (mixing) succinic acid derivative salts throughout a carboxylated rubber a scorch resistant carboxylic rubber composition is produced with the problem of premature cross-linking (scorch) being greatly reduced without significantly affecting the cure rate of the rubber composition. These succinic acid derivative salts can be mixed into dried rubber using any procedure that will result in a thorough mixing. When the mixing is done in the dry state the dry carboxylated rubber and the succinic acid derivative salt are mixed by a rubber compounding means, such as a Banbury mixer or on a rubber mill, under conditions well-known in the art which are normally used for mixing such carboxylated rubbers with compounding ingredients. The succinic acid derivative salt can be mixed with the carboxylated rubber as a separate step in the compounding process or may be mixed together with other compounding ingredients. This process of distributing a succinic acid derivative salt throughout a carboxylated rubber results in the formation of a scorch resistant carboxylated rubber composition without significantly changing the cure properties of the carboxylated rubber. Excellent results can be obtained by mixing succinic acid derivative salts into dried carboxylated rubber with a Banbury mixer.

The salts of succinic acid derivatives which are used as scorch inhibiting agents in the practice of this invention have the structural formula:

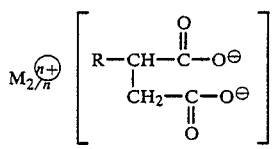

wherein R is an alkyl or alkenyl moiety containing from 8 to 25 carbon atoms, wherein M is a cation having a charge of positive one or positive two, and wherein n is 1 or 2 with the proviso that n is 1 if M has a charge of positive one and with the proviso that n is 2 if M has a charge of positive two. In most cases the cation M will be selected from the group consisting of monovalent metals, divalent metals, ammonium ions, and substituted ammonium ions. Some representative examples of divalent metals include lithium, sodium, potassium, rubidium, and cesium. Beryllium, magnesium, zinc, calcium, strontium, and barium are some examples of divalent metals. If M is lithium, sodium, potassium, rubidium, cesium, ammonium, or an substituted ammonium then n will be 1. For example, if M is sodium then the sodium salt of the succinic acid derivative will have the structural formula:

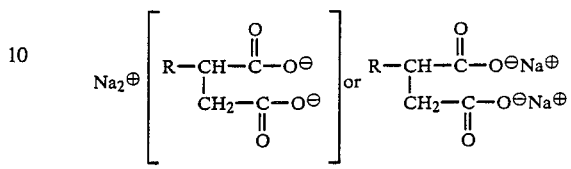

If the salt of the succinic acid derivative is a beryllium, magnesium, calcium, zinc, strontium or barium salt then n will be 2. For example, if M is calcium then the calcium salt of the succinic acid derivative will have the structural formula:

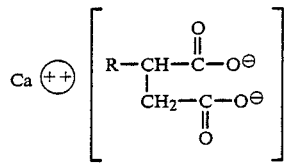

The alkyl or alkenyl groups in these salts of succinic acid derivatives will contain from 8 to 25 carbon atoms and will normally contain from 12 to 17 carbon atoms. Mixtures of salts of succinic acid derivatives wherein R is an alkyl or alkenyl moiety containing from 12 to 17 carbon atoms can be used with excellent success as scorch inhibitors in carboxylated rubber. In such a mixture of various succinic acid derivative salts there will be a distribution of salts of succinic acid derivatives containing varying numbers of carbon atoms in their alkyl or alkenyl substituent groups ranging from 12 to 17, inclusive.

Polyquaternary ammonium salts of succinic acid derivatives can be used as scorch inhibitors with greater success. Substituted ammonium salts of this type are commercially available. For example a polyquaternary ammonium salt believed to have the structural formula:

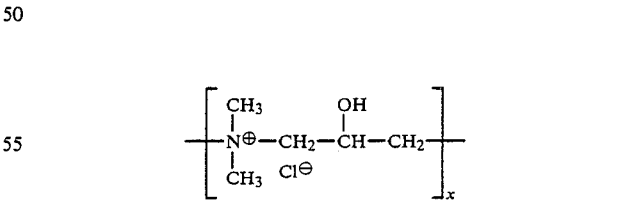

wherein x is an integer varying from about 2 to 15, which has a molecular weight ranging from about 200 to about 2000, is sold by the Nalco Chemical Company as Nalco TM 108. Compounds of this type can be prepared by reacting epichlorohydrin with dimethylamine. In polyquaternary ammonium salts of this type there will normally be 2 to 15 substituted ammonium ions. Such substituted ammonium ions generally have the structural formula:

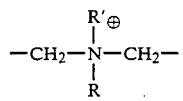

wherein R and R' can be the same or different and represent hydrogen atoms or alkyl groups containing from 1 to 8 carbon atoms. In many cases the substituted ammonium ions will have the structural formula:

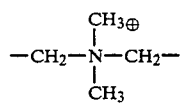

Since such polyquaternary ammonium salts can contain many substituted ammonium ions, each polyquaternary ammonium molecule can represent many M groups in the general structural formula given for the salts of succinic acid derivatives used as scorch inhibitors in the practice of this invention.

The amount of the salt of a succinic acid derivative which will be used to provide good scorch safety for most carboxylated rubbers will generally range between 0.05 and 5 parts per hundred parts of rubber (phr) by weight. These salts of succinic acid derivatives will normally provide excellent scorch safety for a carboxylated rubber at a concentration of about 5 parts per hundred of rubber (phr) by weight. It will usually be desirable to use lesser amounts of these agents since in lower concentrations they can also provide adequate scorch safety. It is contemplated that for most carboxylated rubbers a concentration of from about 0.1 to about 1.5 phr would provide very satisfactory scorch resistance for most applications. The optimum amount will vary with the degree of carboxylation in the rubber being treated and with the processing conditions that will ultimately be employed in manufacturing the rubber into useful products.

The succinic acid derivatives salts which are used as scorch inhibitors in the practice of this invention can be prepared by reacting succinic anhydrides having the structural formula:

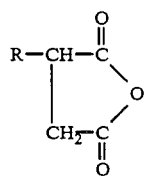

wherein R is an alkyl or alkenyl moiety containing from 8 to 25 carbon atoms, inclusive or dicarboxylic acids having the structural formula:

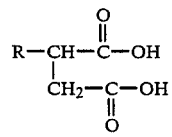

wherein R is an alkyl or alkenyl moiety containing from 8 to 25 carbon atoms, inclusive with a metal or ammonium salt. This reaction can be done using techniques well known to those skilled in the art. For example, such anhydrides and acids can be readily reacted with bases, such as aqueous metal hydroxides to form the salts which act as scorch inhibitors in the practice of this invention. Alkyl or alkenyl succinic acids can be reacted with aqueous potassium hydroxide, sodium hydroxide, or ammonium hydroxide to yield such salts. These salts can then be further reacted with other bases, for example, calcium chloride to yield the calcium salt of the alkyl or alkenyl succinic acid.

This invention is illustrated by the following representative examples which are merely for the purpose of illustration and are not to be regarded as limiting the scope of the invention or the manner in which it may be practiced. Unless specifically indicated otherwise, parts and percentages are given by weight.

EXAMPLE 1

A carboxylated nitrile rubber can be prepared by mixing together 200 parts of deionized water, 0.42 parts of potassium hydroxide, 2.46 parts of dodecylbenzene sulfonic acid, 0.3 parts of sodium acid phosphate, 0.1 parts of tetrasodium ethylene diamine tetraacetate, 7 parts of methacrylic acid, 0.45 parts of tertiary dodecylmercaptan, 27 parts of acrylonitrile, 0.03 parts of cumene hydroperoxide, 66 parts of butadiene, 0.02 parts of sodium formaldehyde sulfoxylate, and 0.001 parts of chelated ferrous sulfate. In the preparation of this charge composition the potassium hydroxide and dodecyl benzene sulfonic acid can be premixed with 196 parts of deionized water and allowed to react for 15 minutes before adding the other components of the charge composition. The sodium formaldehyde sulfoxylate and chelated ferrous sulfate activators can be premixed in a separate vessel in 4 parts of deionized water before they are added to the main reaction vessel and mixed with the other components in the charge composition.

This polymerization can be run in a 20 gallon reactor with agitation by two 6 inch Brumagim mixers at 300 rpm's (revolutions per minute). This polymerization can be run at a temperature of 21° C. (70° F.). This temperature can be maintained for 10 hours at which time the solids content of the emulsion will be about 28 percent. At this point, the reaction will be at approximately 80 percent conversion and 0.1 parts of sodium nitrite can be added as a short stop. The emulsion can then be degassed to remove unpolymerized butadiene monomer that is present. This degassing can be accomplished by applying 20 inches of vacuum to the emulsion for about 10 hours.

Approximately 136 pounds of latex will be produced utilizing this polymerization recipe. Seventy-three pounds of this latex can be added to a solution of 40 pounds of sodium chloride and 710 grams of concentrated sulfuric acid in 600 pounds of water which is at a temperature of 60° C. (140° F.). As this solution is vigorously agitated coagulation of the carboxylated nitrile rubber will occur.

The rubber crumb cam be dipped out of this aqueous solution and dewatered with a dewatering screw down to about 10 percent water. The rubber can then be oven dried to under 0.5 percent moisture content. About 17 pounds of dried rubber will be produced by this process.

A substituted ammonium salt of a succinic acid derivative can be prepared by mixing a mixture of alkenyl succinic anhydrides, hereinafter referred to as ASA, into an aqueous solution of Nalco TM 108 having solids content of about 55%. ASA has the following structural formula:

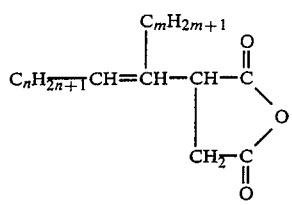

wherein m+n equals 12 to 17. ASA is a mixture of alkenyl anhydrides wherein there is a distribution of alkenyl succinic anhydride molecules with values for m and n varying from 0 to 17, inclusive, and with the sum of m+n ranging from 12 to 17, inclusive. ASA is a liquid that is very soluble in most organic solvents, e.g. acetone, benzene, and petroleum ether and is insoluble in water. Some specific compounds that are representative of those present in ASA include 1-dodecenyl succinic anhydride, 1-heptadecenyl succinic anhydride, 1-methyl-1-hexadecenyl succinic anhydride, 1-methyl-1-undecenyl succinic anhydride, 1-pentyl-1-heptenyl succinic anhydride, 1-heptyl-1-octenyl succinic anhydride, and 1-butyl-1-decenyl succinic anhydride.

Nalco TM 108 is believed to have the structural formula:

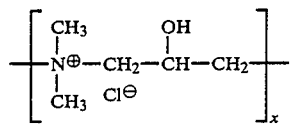

wherein x is an integer varying from about 2 to 15, and to have a molecular weight ranging from about 200 to about 2000.

Minor amounts of a compound with the structural formula:

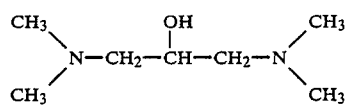

is also believed to be present in Nalco 108. This solution of ASA and Nalco TM 108 can then be evaporated to dryness which results in the formation of a dry polyquaternary ammonium salt of ASA.

A Midget Banbury Mixer manufacturer by Farrel Corporation can be used to compound the rubber. The Banbury can be run at a speed of about 84 rpm's and the rubber can be mixed (by itself) for an initial breakdown period of about one minute. After this initial breakdown period 50 parts of carbon black and 3 parts of the polyquaternary ammonium salt of ASA per 100 parts of rubber can be added and mixed for a period of 3 minutes. This technique results in a very good mixture of the rubber, carbon black and scorch inhibiting agent. Two parts of tetramethyl thiuram disulfide, 1 part of n-oxydiethylene benzothiazole-2-sulfinamide, 5 parts of zinc oxide, and 0.3 parts of sulfur per 100 parts rubber (phr) can then be mill mixed using a rolling bank into the rubber for one minute followed by 10 additional passes through the mill mixer.

The compounded rubber can then be tested to determine its Mooney scorch values at an operating temperature of 121° C. (250° F.) using ASTM Method D1077. The values that will be determined for a 5 and 10 point rise in Mooney scorch (designated as T-5 and T-10, respectively) will be excellent. A T-5 scorch value of 15 minutes or greater is generally considered necessary for adequate scorch safety and can be easily obtained by using this technique.

EXAMPLE 2

In this experiment which was done as a control, 100 parts of Krynac TM 221, a commercially available carboxylated nitrile rubber, was mixed in a Banbury mixer with 5 parts of dibutyl phthalate, 2 parts of stearic acid, 40 of carbon black, 2 parts of tetramethyl thiuram disulfide (a thiuram ultra accelerator), 1 part of N-oxydiethylene benzothiazole-2-sulfenamide (a sulfenamide accelerator), 5 parts of zinc oxide, and 0.5 parts of sulfur. This compounded rubber was then tested to determine its original Mooney scorch values. Mooney scorch values were determined at an operating temperature of 121° C. (250° F.) using ASTM Method D1077 to a 5 point rise (designated as T-5). This carboxylated rubber which depended on stearic acid for scorch protection had an original Mooney Scorch T-5 value of only 7.5 minutes.

Scorch is traditionally a more difficult problem to deal with in climates where there is a high temperature with high humidity. In fact, the storage of a carboxylated rubber in an environment where there is a combination of high temperatures and high humidity can ruin it in a very short time. For example, the compounded carboxylated rubber made in this experiment was ruined by storing it at a temperature of 100° F. (38° C.) and a relative humidity of 92% for 72 hours. In fact, this rubber was scorched so much in this humidity aging test that it could not be used for most applications and had a Mooney MS viscosity minimum that was so high that it could not be measured. Thus, this rubber had scorch safety that was so bad that its Mooney Scorch T-5 value could not be determined.

EXAMPLE 3

This experiment was done using the same procedure as was specified in Example 2 except that one part of ASA was used in place of one part of stearic acid. Thus, this compounded rubber contained one part of stearic acid and one part of ASA as its scorch inhibiting agents. This rubber was then tested to determine its original Mooney scorch and humidity aged Mooney scorch values using the procedures explained in Example 2.

This compounded rubber was determined to have an original Mooney Scorch T-5 value of 24 minutes which is much better than the value of only 7.5 minutes which was determined for the rubber in Example 2 which relied only on stearic acid for its scorch protection. This carboxylated rubber was also determined to have a humidity aged Mooney Scorch T-5 value (after 72 hours at 100° F. (38° C.) and a relative humidity of 92%) of 4.7 minutes. Thus, the humidity aging very substantially reduced the scorch safety of this rubber, but its scorch safety was still much better than that of the rubber in Example 2 even after the humidity aging.

EXAMPLE 4

This experiment was done using the same procedure as was described in Example 3 except that 1.75 parts of Nalco 108 was mixed into the rubber in the Banbury in addition to the other reagents. This compounded carboxylated rubber was determined to have an original Mooney Scorch T-5 value of 27 minutes and a Mooney Scorch T-5 value after the humidity aging of 10 minutes. Thus, this rubber had an original Mooney scorch value which was slightly better than the rubber tested in Example 3 and a humidity aged Mooney scorch value which was much better.

This experiment clearly shows that the addition of Nalco 108 to the rubber composition containing ASA described in Experiment 3 greatly improves its Mooney scorch protection under conditions of high heat and humidity. The addition of the Nalco 108 allows for the ASA to react with it forming a salt of the ASA which provides the carboxylated rubber with improved scorch protection.

The compounded rubber made in this experiment was also tested for rheometer cure properties at 325° F. (163° C.). The rheometer vulcanization properties were determined using a Monsanto oscillating disc rheometer. A description of oscillating disc rheometers can be found in the *Vanderbilt Rubber Handbook* edited by Robert O. Babbit (Norwalk, Conn., R. T. Vanderbilt Company, Inc., 1978), pp. 583–591. The use of this cure meter and standardized values read from the curve are specified in ASTM D-2084. A typical cure curve obtained on an oscillating disc rheometer is shown on page 588 of this edition of the Vanderbilt Rubber Handbook.

In such an oscillating disc rheometer compounded rubber samples are subjected to an oscillating shearing action of constant amplitude. The torque of the oscillating disc embedded in the stalk that is being tested that is required to oscillate the rotor at the vulcanization temperature is measured. The values obtained using this cure test are very significant since changes in the rubber or the compounding recipe are very readily detected. It is obvious that it is normally advantageous to have a fast cure rate. T'C 90 and T'C 95 values of under 20 minutes are normally preferred for carboxylated polymers vulcanized at 325° F. (163° C.).

The cure curves that were obtained were used to determine a torque minimum ($M_L$), a torque maximum ($M_H$), minutes to 90% of the torque increase (T'C 90) and minutes to 95% of the torque increase (T'C 95). T'C 90 and T'C 95 are equivalent to T'90 and T'95 respectively.

This rubber was determined to have a torque minimum ($M_L$) of 8.1, a torque maximum ($M_H$) of 91.4, a T'C 90 of 11.5 minutes, and a T'C 95 of 17.8 minutes. The Nalco 108 salt of ASA greatly improved the Mooney scorch resistance of the carboxylated rubber and did not significantly retard its cure rate. It is very apparent that a combination of Nalco 108 and ASA offer very substantial advantages over the use of stearic acid which is very widely employed by those skilled in the art as a scorch inhibitor. It is also apparent from this example that ASA salts are better scorch inhibitors than is ASA in cases where the rubber will be used in an environment where there are high temperatures and high humidities.

EXAMPLE 5

The procedure used in this experiment was the same as the one specified in Example 4 except that the Nalco 108 and ASA were prereacted before their addition to the Banbury mixer at a ratio of ASA to Nalco 108 of 1:2. In this example 2 phm of the prereacted ASA/Nalco 108 mixture was added to the Krynac 221. This example also differs from Example 4 in that no stearic acid was mixed into the rubber.

This rubber was determined to have an original Mooney Scorch T-5 value of 24.6 minutes and a humidity aged Mooney scorch value of 10.5 minutes. These Mooney scorch values are very good and this example shows that ASA can be prereacted with Nalco 108 to make it into a salt before it is distributed throughout a carboxylated rubber as a scorch inhibitor.

EXAMPLE 6

The procedure specified in Example 5 was also employed in this experiment except that 2 parts of a calcium salt of ASA was mixed into the rubber. This rubber had an original Mooney Scorch T-5 value of 16.4 minutes and a humidity aged Mooney Scorch T-5 value of 6.6 minutes. This example clearly shows that calcium salts of succinic acid derivatives can be used as scorch inhibitors.

EXAMPLE 7

In this experiment a carboxylated nitrile rubber containing about 66% butadiene, 27% acrylonitrile, 7% methacrylic acid was used. This rubber was mixed in a Banbury mixer with 5 parts of dibutyl phthalate (a plasticizer), 1 part of stearic acid, 40 parts of carbon black, 0.5 parts of sulfur, 2 parts of tetramethyl thiuram disulfide (an ultra accelerator), 1 part of N-oxydiethylene benzothiazole-2-sulfenamide (an accelerator), 5 parts of zinc oxide, and 2 parts of a zinc salt of ASA. This rubber had an original Mooney scorch T-5 value of 31.6 minutes and a humidity aged Mooney Scorch T-5 value after being stored at 100° F. (38° C.) at a relative humidity of 92% for 72 hours of 20.6 minutes. This example indicates that zinc salts of succinic acid derivatives have excellent properties as scorch inhibiting agents for carboxylated rubbers.

While certain representative embodiments and details have been shown for the purpose of illustrating the invention, it will be apparent to those skilled in this art that various changes and modifications may be made therein without departing from the scope of the invention.

What is claimed is:

1. An improved scorch resistant carboxylated rubber composition comprising: (1) a carboxylated rubber and (2) at least one salt of a succinic acid derivative having the structural formula:

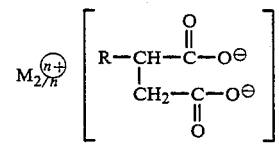

wherein R is an alkyl or alkenyl moiety containing from 8 to 25 carbon atoms wherein M is a cation having a charge of positive one or positive two, and wherein n is 1 or 2 with the proviso that n is 1 if M has a charge of positive one and with the proviso that n is 2 if M has a charge of positive two; which is distributed throughout said carboxylated rubber composition to improve the scorch safety of said rubber composition.

2. An improved scorch resistant carboxylated rubber composition as specified in claim 1, wherein said R is an alkenyl moiety containing from 12 to 17 carbon atoms, inclusive.

3. An improved scorch resistant carboxylated rubber composition as specified in claim 1, wherein M is a monovalent metal selected from the group consisting of lithium, sodium, and potassium.

4. An improved scorch resistant carboxylated rubber composition as specified in claim 2, wherein said R has the structural formula:

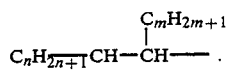

5. An improved scorch resistant carboxylated rubber composition as specified in claim 1, wherein M is a substituted ammonium ion.

6. An improved scorch resistant carboxylated rubber composition as specified in claim 5, wherein M is a polyquaternary ammonium ion.

7. An improved scorch resistant carboxylated rubber composition as specified in claim 1, further comprising a metal oxide which is distributed throughout said carboxylated rubber composition.

8. An improved scorch resistant carboxylated rubber composition as specified in claim 7, wherein said metal oxide is a member selected from the group consisting of zinc oxide, magnesium oxide, copper oxide, calcium oxide and nickel oxide.

9. An improved scorch resistant carboxylated rubber composition as specified in claim 8, wherein said metal oxide is zinc oxide.

10. An improved scorch resistant carboxylated rubber composition as specified in claim 1, wherein said carboxylated rubber is a member selected from the group consisting of terpolymers of methacrylic acid, styrene, and butadiene, terpolymers and methacrylic acid, acrylonitrile, and butadiene; terpolymers of acrylic acid, acrylonitrile, and butadiene; terpolymers of methacrylic acid, vinylidene chloride, and butadiene; copolymers of methacrylic acid and butadiene; and copolymers of methacrylic acid and isoprene.

11. An improved scorch resistant carboxylated rubber composition as specified in claim 10, wherein said carboxylated rubber is a terpolymer of methacrylic acid, acrylonitrile, and butadiene.

12. An improved scorch resistant carboxylated rubber composition as specified in claim 1, wherein the total concentration of said salt of a succinic acid derivative is between 0.05 and 5 phr by weight.

13. An improved scorch resistant carboxylated rubber composition as specified in claim 4, wherein M is a polyquaternary ammonium.

14. An improved scorch resistant carboxylated rubber composition as specified in claim 13, wherein the total concentration of said salt of a succinic acid derivative is between 0.05 and 5 phr by weight.

15. An improved scorch resistant carboxylated rubber composition as specified in claim 14, further comprising zinc oxide which is distributed throughout said carboxylated rubber composition.

16. An improved scorch resistant carboxylated rubber composition as specified in claim 15, wherein said carboxylated rubber is a carboxylated nitrile rubber.

17. An improved scorch resistant carboxylated rubber composition as specified in claim 16, wherein said polyquaternary ammonium has the structural formula:

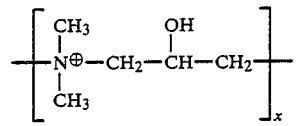

wherein x is an integer from about 2 to 15.

18. An improved scorch resistant carboxylated rubber composition as specified in claim 17, wherein the total concentration of said salt of a succinic acid derivative is from about 0.1 to 1.5 phr by weight.

19. An improved scorch resistant carboxylated rubber composition as specified in claim 4, wherein M is zinc.

20. An improved scorch resistant carboxylated rubber composition as specified in claim 19, wherein the total concentration of the zinc salt of the succinic acid derivative is between 0.05 and 5 phr by weight.

21. A process for improving the scorch resistance of a carboxylated rubber composition comprising distributing throughout a carboxylated rubber at least one succinic acid derivative salt having the structural formula:

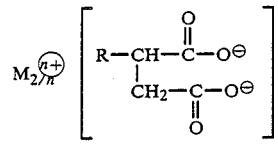

wherein R is an alkyl or alkenyl moiety containing from 8 to 25 carbon atoms, wherein M is a cation, and wherein n is 1 or 2 with the proviso that n is 1 if M has a charge of positive one and with the proviso that n is 2 if M has a charge of positive two, to improve the scorch safety of said rubber composition.

22. A process for improving the scorch resistance of a carboxylated rubber composition as specified in claim 21, wherein R is an alkenyl moiety containing from 12 to 17 carbon atoms, wherein M is a polyquaternary ammonium, wherein said carboxylated rubber is a carboxylated nitrile rubber, and wherein the total concentration of said salt of a succinic acid derivative distributed throughout said carboxylated rubber is from 0.05 to 5 phr by weight.

* * * * *

UNITED STATES PATENT AND TRADEMARK OFFICE
CERTIFICATE OF CORRECTION

PATENT NO. : 4,520,156
DATED : May 28, 1985
INVENTOR(S) : Donald C. Grimm

It is certified that error appears in the above-identified patent and that said Letters Patent is hereby corrected as shown below:

The term of this patent subsequent to November 15, 2000 has been disclaimed.

Signed and Sealed this

Twenty-third Day of July 1985

[SEAL]

Attest:

DONALD J. QUIGG

Attesting Officer     Acting Commissioner of Patents and Trademarks